United States Patent

[11] 3,567,176

[72] Inventor Herbert G. Johnson
17 N. Drexel Ave., Havertown, Pa. 19083
[21] Appl. No. 785,662
[22] Filed Dec. 20, 1968
[45] Patented Mar. 2, 1971

[54] BALL VALVE ASSEMBLY WITH STEM ACTUATOR SEAL
7 Claims, 4 Drawing Figs.

[52] U.S. Cl. .................................... 251/174,
251/172, 251/214, 251/315, 251/335.2, 251/309
[51] Int. Cl. ........................................... F16k 5/14
[50] Field of Search......................... 251/174,
315, 335, 335.1, 335.2, 355, 330, 309, 214;
137/375

[56] References Cited
UNITED STATES PATENTS

| | | | |
|---|---|---|---|
| 2,573,177 | 10/1951 | Bohlen .................. | 251/174X |
| 2,837,308 | 6/1958 | Shand..................... | 251/174 |
| 2,942,840 | 6/1960 | Clade ..................... | 251/174 |
| 3,108,779 | 10/1963 | Anderson................ | 251/315X |
| 3,111,136 | 11/1963 | Persidsky ............... | 251/315X |
| 3,233,862 | 2/1966 | Marsh .................... | 251/174X |
| 3,356,337 | 12/1967 | Olen...................... | 251/315 |
| 3,367,359 | 2/1968 | Johnson ................. | 251/315X |
| 3,394,915 | 7/1968 | Gachot................... | 251/174 |
| 3,401,914 | 9/1968 | Shand..................... | 251/174X |
| 1,807,139 | 5/1931 | Volodimirov .......... | 251/335.2X |
| 2,662,722 | 12/1953 | Graziano................ | 251/335.2X |
| 3,096,966 | 7/1963 | McFarland............. | 251/214 |
| 3,241,811 | 3/1966 | Kilbourne............... | 251/315UX |
| 3,334,650 | 8/1967 | Lowrey .................. | 251/315X |

FOREIGN PATENTS

| 978,601 | 12/1964 | Great Britain........... | 251/174 |
| 1,354,265 | 1/1964 | France ................... | 251/174 |

*Primary Examiner*—Clarence R. Gordon

ABSTRACT: This application discloses a ball valve assembly in which a valve ball is preloaded between annular seals, at least one of which is carried by a resilient structural conduit member, specifically in a groove of the resilient member, the sides of the groove seat fitting the ball surface to provide a fail-safe seal when the sealing ring is worn down, the valve being especially suitable for lined and fully sealed pipes adapted to carry corrosive, radioactive, or otherwise harmful or dangerous fluids and having a fully sealed valve operator which is preferably urged tight by internal fluid pressure.

INVENTOR.
HERBERT G. JOHNSON

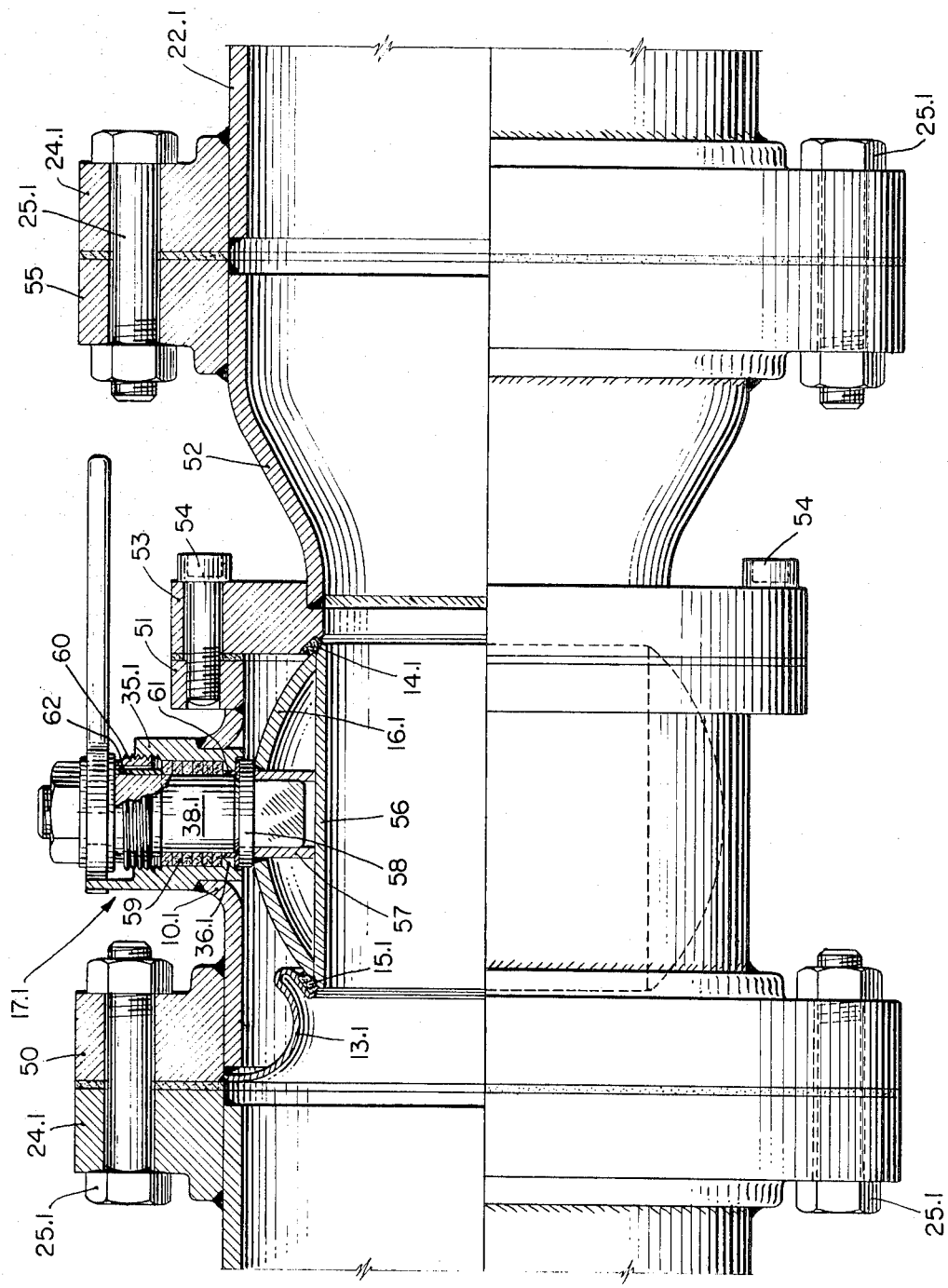

3,567,176

BALL VALVE ASSEMBLY WITH STEM ACTUATOR SEAL

BACKGROUND OF INVENTION

In my U.S. Pat. No. 3,073,336 there is disclosed a fully lined ball valve assembly in which the ball seal is provided by a portion of the casing lining which is urged against the ball by confined elastic rings disposed in annular casing recesses behind the lining.

In my U.S. Pat. No. 3,367,359 there is disclosed a ball valve assembly in which annular sealing rings are carried by conduit sleeves and are urged against the ball by confined elastic rings assisted by fluid pressure.

SUMMARY OF INVENTION

The present invention aims to improve upon this general type of ball valve assembly by providing to improve upon this general type of ball valve assembly by providing sealing means for a ball which will follow up the ball travel and hold it in proper operating position while keeping it fully sealed at all times in both open and closed position. This is especially desirable for free floating valve balls. It provides opposed seal ring supports, at least one of which is a resilient conduit member which is rigidly and sealingly secured to the valve casing and is preloaded against the valve ball and its opposed seal when the casing is assembled on the valve ball. Preferably the casing structure provides for the assembly of the ball operating stem and valve ball from inside one end of the casing with structural arrangements to provide increased stem seal by internal fluid pressure. This permits the use, if desired, of a one-piece casing unit large enough to receive the valve ball interiorly from one end after the stem has been inserted and secured, followed by the sealing securement of the resilient conduit member in the casing against the ball. The arrangement also facilitates the use of corrosion resistant pipe and valve casing lining, as of stainless steel, fluorocarbon polymers ("Teflon," etc.) and of corrosion-resistant operating stem liners, as of like materials.

For atomic energy installations involving radioactive fluids it is often desirable to have fused or other permanent joint seals to provide positive assurance against leakage of harmful fluid under any and all conditions.

The ball sealing means hereby provided is designed for use in such permanently sealed assemblies to furnish very long life and fail-safe seal on the sealing ring seat supports themselves if the seal rings become worn to the extent that such fail-safe sealing is required. Since the present arrangement avoids sealing by flexure of the seal rings themselves but instead provides resilient structural means carrying the seal rings in broad contact with the valve ball, the rapid wear and deterioration of the seal ring itself is avoided and much longer seal ring life is obtained, together with the fail-safe seal by the resilient seal ring retaining means. Moreover, it permits the use of nonresilient low-friction sealing ring material which has much longer life than resilient materials, as well as being capable of withstanding higher temperatures and pressures. Material which is not subject to deterioration by radioactive fluids can be used for the sealing rings since the sealing rings themselves do not have to be resilient or elastic when they are mounted on a resilient structural support.

DRAWINGS

The object, advantages, and novel features of the invention will be apparent from the following description of certain exemplary embodiments, reference being made to the accompanying drawings, wherein:

FIG. 4 is a side elevation and longitudinal section of a modified form having elongated venturi-type conduit members on each side of the valve, one of these conduit members being a resilient support for one of the ball sealing rings.

SPECIFIC DESCRIPTION

Figure 1:
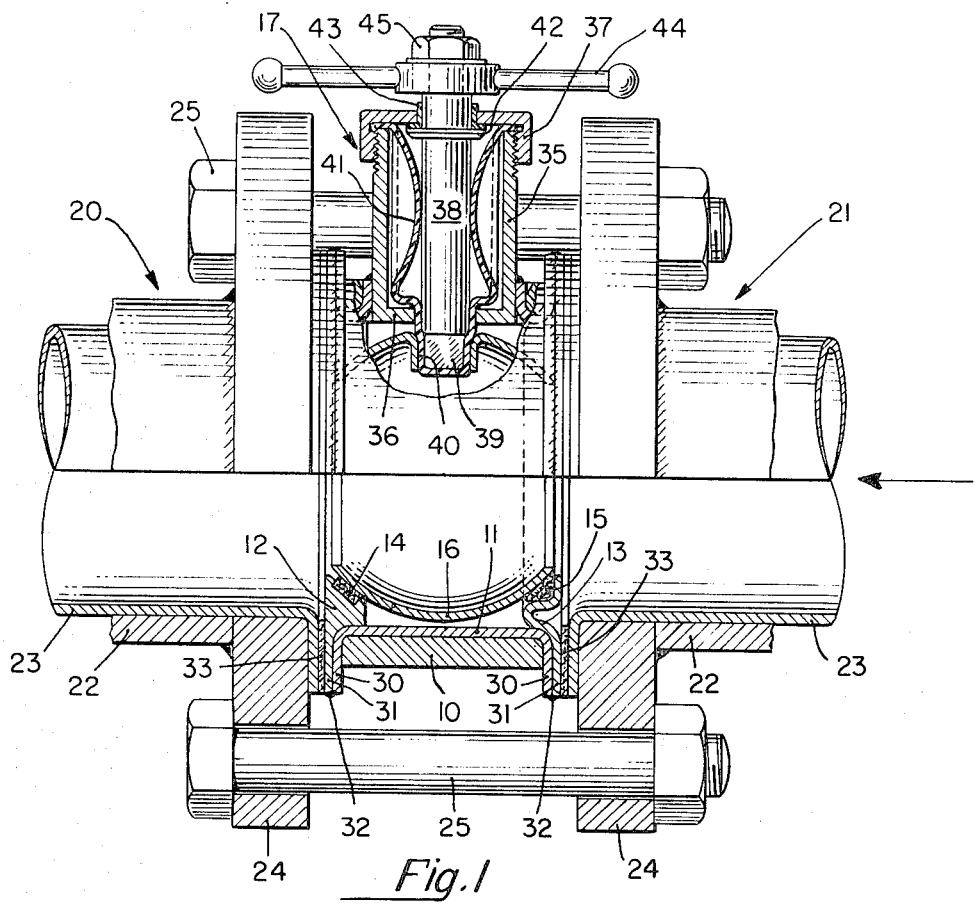
FIG. 1 is a side elevation and longitudinal section of a ball valve assembly embodying the present invention, the valve assembly being connected in a pipe line.
Figure 2:
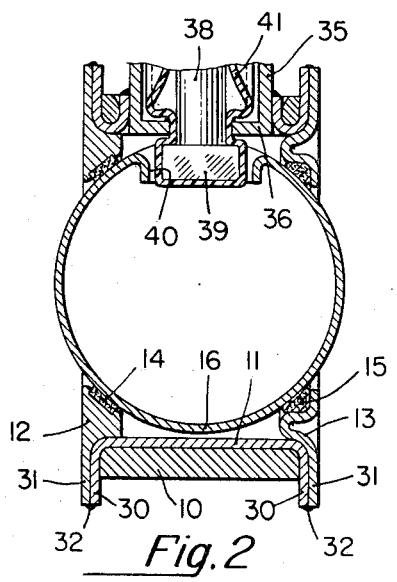
FIG. 2 is a similar view of the valve assembly alone with the valve ball turned to a closed position.

Referring to FIGS. 1 and 2, the ball valve assembly comprises a relatively thick load-taking valve casing spool 10 of a strong relatively inexpensive material, such for example, as steel, brass, bronze, cast iron, or the like, an inner spool liner ring 11 of corrosion resistant material, such for example, as stainless steel or the like, corrosion resistant ball retaining end conduit members 12, 13 carrying annular sealing rings 14, 15, a corrosion resistant valve ball 16, and valve ball operating means referred to generally by the numeral 17.

The valve assembly is shown as being mounted between pipe units 20, 21, each comprising an outer strong pipe element 22, an inner corrosion resistant lining element 23, and an end flange 24 welded to the outer pipe element 22. The valve unit is clamped between the pipe units, as by tie rods 25.

The lining ring 11 at the ends is provided with outwardly extending flanges 30 and the end conduit members 12, 13 are provided with outwardly extending flanges 31. Initially the flanges 30 and 31 may be spaced apart, with heat-resistant sealing rings between, if desired, and are drawn together under pressure to force the sealing rings 14 and 15 against the valve ball. In final position it is desirable to make a permanent seal between the flanges 30, 31, as by solder or weld joint 32. As shown, the pressure is applied by drawing up on the tie rods 25 but, if desired, the valve unit may be completely preassembled by clamping the parts together and securing them by weld joints and subsidiary means, such as bolts, screws or the like, if needed. Herein, heat, pressure, and corrosion and radioactive resistant sealing rings 33 are provided between the valve assembly and the ends of the pipe units 20, 21. Also the pipe lining 23 and the flanges 31 of the end members 12 and 13 may be permanently sealed and connected, as by outside soldering, welding, or the like, the sealing rings being reduced in external diameter to facilitate the making of welds around them.

It is desirable to have a valve ball operating means, here designated as a unit by the numeral 17, which is permanently sealed by corrosion resistant material. As shown, a tubular casing 35 is welded to the spool 10, the casing at the bottom having a transverse apertured wall 36 and at the top having an apertured cap 37 to support a valve stem 38. The lower end of the valve stem 38 is provided with a rectangular portion 39 which enters a rectangular slot 40 in the valve ball when the ball is inserted from the inside of the casing, in known manner, before the spool space is closed by the last applied end member, of course.

The lower end and sides of the valve stem are covered by an axially corrugated tubular corrosion and radioactive resistant envelope 41, as of a fluorocarbon polymer or other suitable material which is sealingly anchored at the upper end when the cap 37 is clamped down upon its upper end flange.

The stem 38 has a flange or collar 42 fixed thereon which bears against an angular sealing element 43, as of corrosion resistant low friction sealing and bearing material, such as a fluorocarbon polymer ("Teflon," etc.), to resist outward thrust caused by fluid pressure in the valve assembly and act as a secondary fluid-tight seal in case of failure of the envelope 41. The valve stem is turned by a handle 44 suitably secured thereon, as by mounting it on a nonround stem portion and retention by a screwed on nut 45.

The tubular envelope is corrugated or fluted so as to be twistable between its ends when the valve stem is turned, in turning the ball. Various envelope materials which are fatigue resistant and suitable to resist various fluids being conveyed are known, such as rubber, neoprene, and various plastic polymers including fluorocarbon polymers mentioned above.

Some polymers for use may be made stronger and more resistant to fatigue by solid-state-work-strengthening.

At least one of the end members 12, 13 is resilient, that is, at least a portion is resilient to press the sealing ring 14 or 15 against the valve ball to provide a seal under all fluid pressure conditions which may exist in the pipe line. In FIGS. 1 and 2, where the flow is unidirectional, it is sufficient to have a resilient member 13 on one side only.

Figure 3:
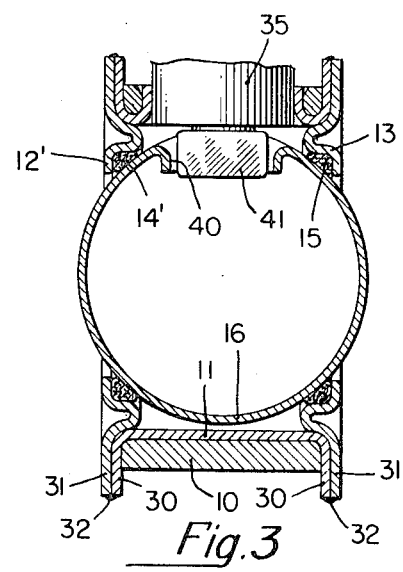
FIG. 3 is a view similar to FIG. 2 but showing resilient structural conduit supports at both sides of the valve ball.

In FIG. 3, which is otherwise the same as the previous form, and the same designations applied, both of the end members 12' and 13 are resilient. This is useful for reverse-flow systems, especially when full-floating valve ball assemblies are used, to provide yield in either direction. The spring pressure on either side will be made sufficient to maintain a seal on the seal rings 14', 15 at the highest fluid pressure to be expected in the system.

The form shown in FIG. 4 employs the same broad principles as the other forms but varies mainly in having venturi-type tubular resilient elements and in having a valve ball operating unit which provides for the valve stem as well as the valve ball to be inserted from the interior. Pipe and valve casing lining is omitted for simplicity in the FIG. 4 form.

A valve casing spool 10.1 has a connection flange 50 secured thereto at one end, as by welding, a ring 51 secured thereto at the other end, as by welding, and in an opening on one side there is secured, as by welding, a tubular casing 35.1 of a ball operating means generally designated as 17.1. At one end of the spool 10.1, that carrying the flange 50, there is secured, as by welding, a venturi tubular resilient member 13.1 having a recessed seat carrying an annular sealing ring 15.1.

At the other end, that having the ring 51, there is provided a venturi tubular element 52 having secured thereon at its inner end, as by welding, a flange 53 adapted to be secured, with a ring seal interposed, to the spool ring 51, as by cap screws 54, and the tubular element 52 having secured on its outer end, as by welding, a pipe connection flange 55. The flange 53 is provided with a recessed seat carrying an annular ball sealing ring 14.1. If a resilient tubular seal ring carrying member is desired at this end it may readily be provided by making the tubular member straight, a flange 53 larger, and securing a resilient seal-ring carrying member similar to 13.1 interiorly in the member 52.

The valve ball 16.1 is provided with a tubular core member 56, as by welding in a tube, and with a tubular member 57, also welded in, carrying the rectangular socket for the end of the valve stem 38.1.

The valve stem 38.1 has a flange or collar 58 disposed below the bottom interior flange 36.1 of the part 35.1, with a friction-reducing ring therebetween, whereby interior fluid pressure increases the effectiveness of the stem seal.

Resilient packing 59 is held by a gland nut 60 to retain and seal the stem 38.1. Sleeves 61, 68 of low friction material are provided for lower and upper bearing points of the stem 38.1. The stem 38.1 has a handle 44.1 retained by a nut 45.1.

The pipe units have a pipe proper 22.1 and a flange 24.1 for securement to the valve unit, as by bolts or tie rods 25.1, sealing rings being clamped between flanges.

The flexible seal-carrying conduit members are preferably, as shown, made as actual integrated parts of the valve casing assembly, as ready for use, as by welding to the casing. This avoids the chance of displacement or loss of seal with the casing in use as might occur if a separate part should be supplied as an accessory and sealed to the casing with a gasket alone for the seal.

Although the seal-carrying conduit element of the casing has inherent flexibility, the casing structure is not weakened, so that pipe line stresses cannot affect the seal alignment; in fact, the flexibility of the seal-carrying conduit member enables it to compensate for any casing deformations which might occur due to excessive pipe line strain upon the casing or body of the valve; and the flexibility of the seal support, as contrasted with flexibility in the seal ring itself, provides adjustment to assure proper engagement of the seal rings with the ball at all times as well as to compensate and follow up for ring wear.

The range of materials which can be used for sealing rings is greatly expanded by having the present resilient seal ring mounting. Plastic polymers, such as fluorocarbon polymers, can still be used but since the seal ring itself does not need to be resilient the sections may be made much thinner and varied in type. For example, polymer-filled or impregnated porous metals, laminates, and the like, which are less subject to wear than a simple polymer alone, may be used. Graphite-carbon and plastics with high graphite content such as "Graphitar," "Synvarac,""Graphoil," graphite in fiber form, film, or the like, can be used; also plastics which have lubricating properties when filled with water or oil, such as nylon polycarbonate; also a metal coated with oxide or "superalloys" such as Haynes 025 stellite having a composition of about 19—21 percent chrome, 9—11 percent nickel, 4—16 percent tungsten, and 46—53 percent cobalt; also molybdenum disulfide.

While the first form of FIGS. 1—3 does not show a flow-confining tubular core for the ball, such as that shown at 56 in FIG. 4, this can readily be provided, if desired.

From the above description it will be seen that the invention provides a simple, dependable, rugged, and long-life ball valve construction in which the ball sealing rings, or at least one of the two opposed rings provided, are carried by resilient structural conduit mountings which enable nonresilient, thinner, denser, and more durable materials to be used for seals. Also a fail-safe or drop-safe construction is provided in which the seal ring retaining groove seat elements form a satisfactory seal if the seal rings wear out or otherwise fail.

The envelope 41 is fluid-pressured externally and internally it is supported by the valve stem 38. It is secured to the stem casing 35 at its outer end and is sealed to the stem 38 at its inner end. This provides for turning the valve stem and valve ball through the necessary angle of 90 ° or more by twisting the envelope. Since the main portions of the casing are hermetically sealed by fuse welding or tight static seals having no relatively moving or sliding parts and since the envelope has no relatively moving or sliding parts, the entire assembly is hermetically sealed drop-tight without the need for primary stem packing; and the secondary stem seal at 42, 43 serves as protection in case of envelope failure. If the envelope should fail, it can be quickly replaced from the outside by removing fluid from the system, removing the cap 37 and valve stem, placing a new envelope on the stem, and restoring the stem and envelope assembly in the casing.

The stem casing 35 is preferably composed of corrosion resistant material, such as stainless steel. The tube or pipe, valve casing, ball, and stem casing can, if desired, be lined with corrosion resistant plastic, as in my prior patents.

While certain embodiments of the invention have been described by way of example, it is to be understood that there may be various embodiments and modifications within the general scope of the invention.

I claim:

1. A ball valve assembly comprising in combination, a ball valve casing, a valve ball operatively and sealingly mounted in the valve casing, a valve stem casing, a ball-turning stem turnably mounted in said valve stem casing and separably engaging a socket in the valve ball, and static nonsliding hermetic sealing means for said valve stem, comprising a tubular twistable envelope of flexible corrosion-resistant material sealingly secured at its outer end to said valve stem casing and sealingly secured at its inner end to the valve stem at a point disposed within said socket in said assembly, providing for turning the valve stem and valve ball through the necessary extensive angle by twisting said envelope.

2. A ball valve assembly as set forth in claim 1, wherein said envelope is comprised of a longitudinally corrugated flexible material.

3. A ball valve assembly as set forth in claim 1, wherein said stem includes an annular flange disposed interiorly below an apertured closure wall, and an annular sealing member disposed between said annular stem flange and said closure wall and within the outer end portion of said envelope where secured to said valve stem casing, said sealing member comprising corrosion-resistant fatigue-resistant material sealingly secured to said closure wall at its stem aperture to act as a secondary seal in case of failure of said envelope.

4. A ball valve assembly as set forth in claim 3, wherein said sealing member and said envelope are comprised of a fluorocarbon polymer.

5. A ball valve assembly as set forth in claim 1, in which the inner end of said envelope is closed and embraces the inner end of the valve stem in its socket in the valve ball.

6. A ball valve assembly as set forth in claim 1, in which end sealing means are provided at the opposite ends of the valve ball, said sealing means for at least one end of the valve ball having resilient mounting means, the sealing envelope on the valve stem within the ball socket providing yield for movement of the valve ball provided by said resilient ball seal mounting means.

7. A ball valve assembly as set forth in claim 6, in which resilient mounting means for the ball sealing means are provided at both ends of the valve ball, the envelope on the valve stem within said ball socket accommodating the movement of the ball provided by the resilient seal mounting means at both ends of the valve ball.